Dec. 13, 1938.   W. G. DUNN   2,140,152
WIND DRIVEN GENERATOR STRUCTURE
Filed Feb. 21, 1938   2 Sheets-Sheet 1
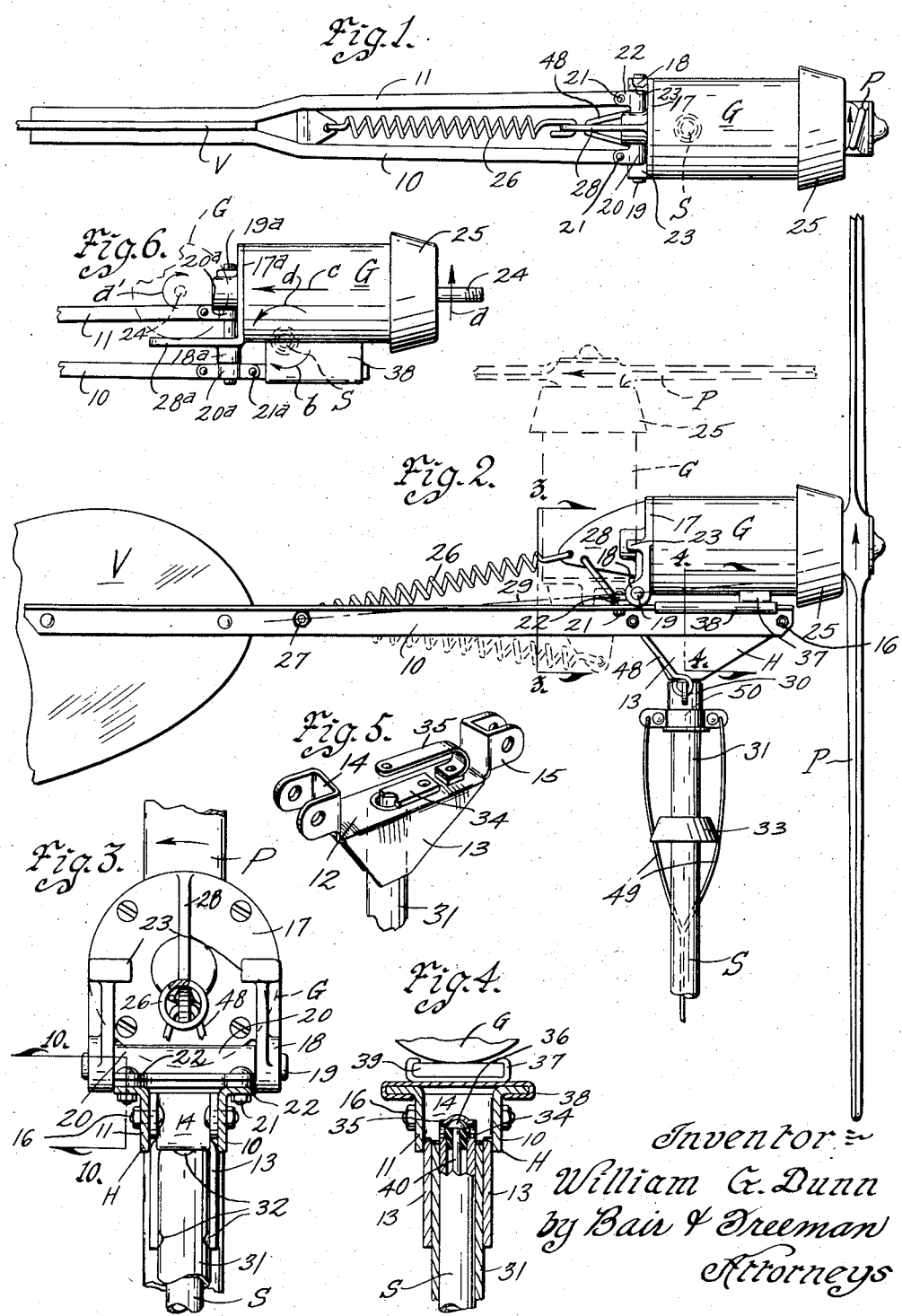
Inventor
William G. Dunn
by Bair & Freeman
Attorneys

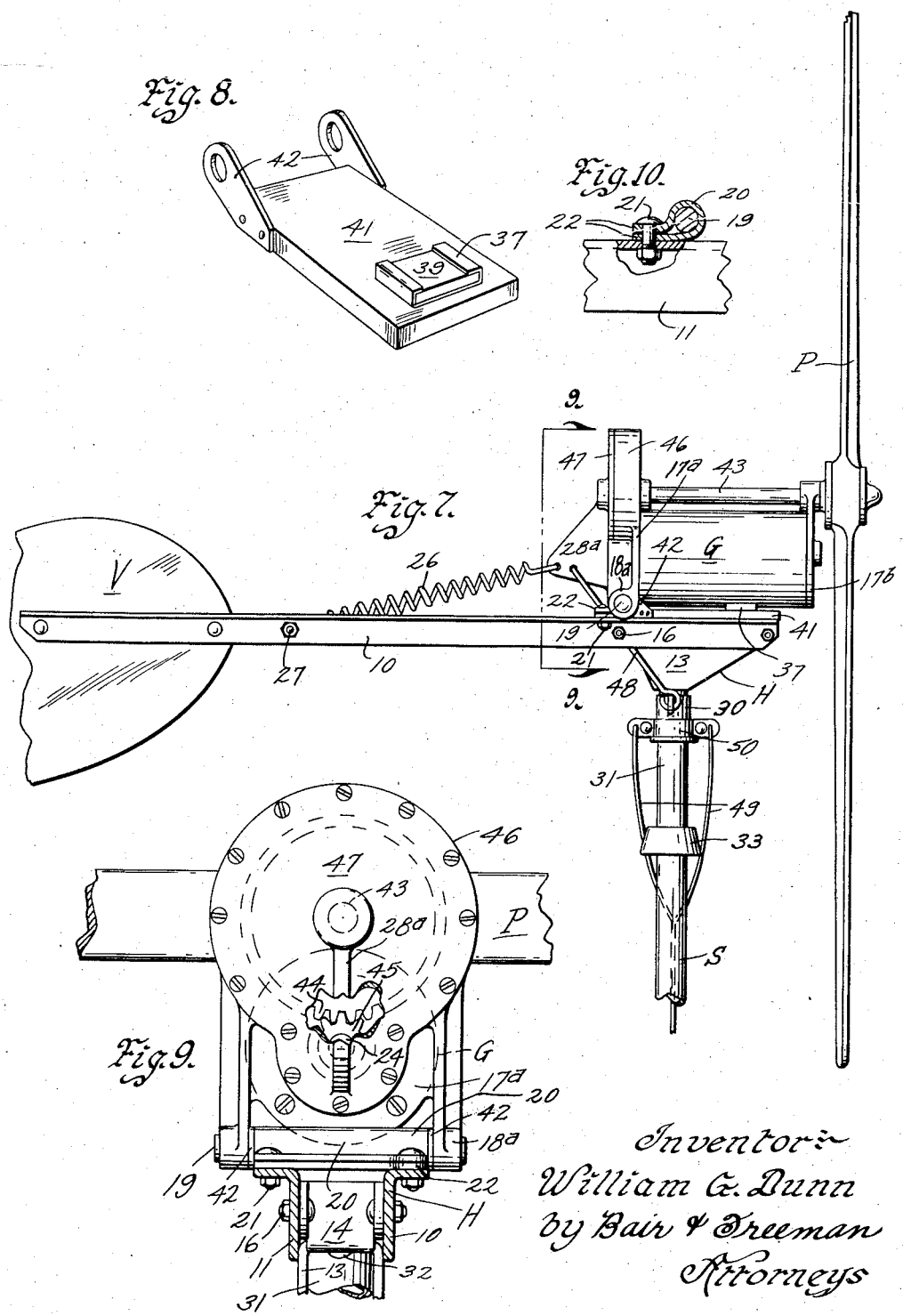

Patented Dec. 13, 1938

2,140,152

UNITED STATES PATENT OFFICE 2,140,152

WIND DRIVEN GENERATOR STRUCTURE

William G. Dunn, Clarinda, Iowa

Application February 21, 1938, Serial No. 191,715

27 Claims. (Cl. 290—55)

One of the objects of my present invention is to provide a wind driven generator structure which can be economically manufactured and which has the parts thereof so arranged that inherent advantages are secured for governing the action of the generator in response to different degrees of wind pressure against the propeller driving the generator.

Another object is to provide a wind driven generator structure including a frame mounted for pivotal movement about a vertical axis and a propeller pivotally mounted on the frame in such a manner that the propeller can be tipped upwardly from a position with its axis horizontal toward a position with its axis vertical due to excessive wind pressure thereagainst whereby the plane of the propeller is then presented at an angle to the wind so that the wind then has less effect on it thereby permitting its rotation to be reduced and resulting in self-governing the rotation of the propeller and the generator connected with it.

Another object is to locate the pivot for the propeller rearwardly of the vertical pivot axis of the frame so that regardless of what position the propeller is tipped to, the pressure of the wind thereagainst aids the vane in keeping the frame of the machine straight into the wind against the centrifugal action of the propeller to rotate the frame on its vertical pivotal axis.

A further object is to provide means for counteracting the tendency of the frame to rotate about its vertical axis when the propeller is tipped back to position with its axis of rotation vertical, which tendency is caused by the torque of the propeller itself, the anti-tendency being produced by offsetting the propeller in the proper direction at one side of the vertical axis so that pressure of the wind against the propeller tends to rotate the frame in the opposite direction about the vertical axis.

Still another object is to provide a structure so designed that a simple head member may be formed of heavy sheet metal and serve as a connection between a vertical support which is pivotally mounted and vane arms which support a vane, the generator and the propeller being pivotally mounted relative to the vane arms by the means of an end plate on the generator which includes means for pivoting the generator to the vane arms. The generator end plate is also provided with a fin with which a spring is connected to bias the propeller to remain in non-tipped position and a vertically slidable member on the vertical support effects manual tipping of the propeller to a position out of the wind. The vertically slidable member has a substantially direct pull on the fin and the fin moves to a position between the vane arms when it is swung downwardly either as a result of wind pressure against the propeller or operation of the manual throw out means.

Still another object is to provide distributor mechanism located between the vane arms and covered by a cover plate which may be either slidably mounted on the vane arms or pivotally mounted on the pivot pin for the propeller and which carries a cushioning means for the generator to engage when it is in normal position.

With these and other objects in view my wind driven generator structure consists in a construction, arrangement and combination of parts whereby the objects contemplated are attained, as hereinafter more fully set forth, pointed out in my claims and illustrated in the accompanying drawings. Although the invention is susceptible of a variety of embodiments, I have illustrated but a few preferred and desirable embodiments thereof in the accompanying drawings, in which:

Figure 1 is a plan view of a wind generator structure embodying my invention.

Figure 2 is a side elevation thereof showing the propeller in normal position and by dotted lines showing it in its extreme tipped back position.

Figure 3 is an enlarged sectional view on the line 3—3 of Figure 2.

Figure 4 is an enlarged sectional view on the line 4—4 of Figure 2 showing the distributor mechanism, a cover therefor and a cushioning means for the generator.

Figure 5 is a perspective view of the head member of my generator structure.

Figure 6 is a plan view of a modified structure in which the axis of rotation of the propeller is offset relative to the vertical axis about which the frame of the machine pivots.

Figure 7 is a side elevation of a modified structure including step up gearing mechanism for driving the generator from the propeller and showing a modified form of distributor cover.

Figure 8 is a perspective view of the modified form of the distributor cover.

Figure 9 is an enlarged sectional view on the line 9—9 of Figure 7, and

Figure 10 is a sectional view on the line 10—10 of Figure 3 showing a bracket for mounting the pivot pin of the generator structure.

On the accompanying drawings I have used the reference character S to indicate a vertical support, G a generator, P a propeller for driving the generator and V a vane for normally pointing the propeller into the wind. The vane V and the generator G are carried by a frame which includes a head member H and vane arms 10 and 11.

The head member H comprises a plate having a central horizontal portion 12, a pair of down turned flanges 13 and a pair of up turned flanges 14. The flanges 14 are provided with perforated ears 15. (See Fig. 5.) The ears 15 are secured as by bolts 16 to the vane arms 10 and 11 which arms are to be held spaced from each other by the head member H. Adjacent their rear ends, the arms 10 and 11 converge and are secured to the vane V in any suitable manner.

The generator G has a rear end plate 17 provided with a pair of trunnions 18. The trunnions 18 receive a pivot pin 19 which in turn is supported relative to the vane arms 10 and 11 by a bracket 20. The bracket 20 consists of a plate wrapped around the pivot pin as shown in Figure 10 and clamped thereon by clamp bolts 21 extending through flanges 22 of the plate. The bolts 21 then extend through horizontal flanges of the arms 10 and 11 which are angle shaped in cross section as shown in Figure 3. Thus when the bolts 21 are tightened, the pivot pin 19 is clamped in position against any longitudinal movement crosswise of the vane arms 10 and 11. The end plate 17 also includes a pair of stop lugs 23 which are adapted to engage the arms 10 and 11 when the generator is swung to the vertical position shown by dotted lines in Figure 2.

The propeller P may be mounted directly on the generator shaft shown in Figure 6. A cowling member 25 is interposed between the propeller and the generator to cover the front end of the generator. The weight of the generator and the propeller causes them to normally assume the position shown in full lines in Figure 2 whereas it is obvious that excessive wind pressure against the generator and the propeller will cause them to tip upwardly toward the dotted position of Figure 2 against the force of gravity.

To aid the wind pressure initially in overcoming gravity due to the weight of the generator and to bias the propeller against tipping backwardly due to excessive wind pressure thereagainst I provide a spring 26. The spring 26 is connected to a bolt 27 carried by the vane arms and to a wing-like projection 28 of the generator end plate 17. A center line is indicated at 29 in Figure 2 passing through the pivot pin 19 and the bolt 27. The spring 26, it will be noted, is above this center line and therefore tends to swing the generator upwardly against the force of gravity tending to retain it in lowered position. The spring is so adjusted, however, that the weight of the generator overcomes the tension of the spring to a substantial degree.

As the wind pressure against the propeller increases above a predetermined maximum, the generator tips toward an overbalanced position on the rear side instead of the forward side of the pivot pin 19 and the spring 26 is increased in length whereby the increased tension of the spring opposes tipping of the propeller from the full line position to the dotted line position and the tension of the spring is increased in proportion to the wind against the propeller. Thus the action of the propeller is self-governed so that it remains substantially at a predetermined rate of rotation regardless of the speed of the wind.

For manually throwing out the generator, I provide a collar 30 slidably mounted on a sleeve 31.

The sleeve 31 forms part of the head member as it is secured as by welding 32 (see Figure 3) to the flanges 13 and the central portion 12 of the plate which forms the head member. The sleeve 31 is rotatable on the vertical support S which support is preferably tubular as shown in Figure 4. The sleeve 31 fits down against an inverted pan shape member 33 which covers electrical terminal connections as fully shown in my copending application Serial No. 137,506, filed April 17, 1937. I also show in said co-pending application distributor mechanism which is shown in the present application in Figures 4 and 5. The distributor mechanism consists briefly of a leaf spring 34 (for engaging the upper end of the support S to effect an electric ground when assembling the support and the member H relative to each other) and an insulated leaf spring 35. The leaf spring 35 engages the head 36 of a current conductor 40 which is mounted in the upper end of the support S as shown in Figure 4 and insulated relative thereto. The spring 35, of course, is connected to one terminal of the generator, the other terminal of which is grounded. The distributor mechanism forms no part of my present invention except that it may be conveniently located so as to be enclosed by the plate 12 forming a bottom, the vertical flanges of the vane arms 10 and 11 forming the sides and a cover plate 38 forming a top therefor.

The cover plate 38 is provided with hooked flanges and is slidably mounted on the arms 10 and 11 as shown in Figure 4 so that it can be conveniently removed for access to the distributor mechanism. It is also desirable to have a cushioned stop means for the generator in its lowered position. This may consist of a block 39 of rubber or the like conveniently supported by the cover plate 38 as by a retainer plate 37 secured thereto.

In Figure 7, I show a modified form of distributor cover consisting of a cover member 41 having a pair of perforated ears 42. The ears are pivoted on the pivot pin 19 and the cover 41 may thereby be swung upwardly when access to the distributor is desired. This eliminates any possibility of rattling as might be experienced by the slidable cover 38 as the plate 41 is held in position by gravity and by weight of the generator when it is in lowered position. The plate 41 supports the cushioning member or bumper 39 as clearly shown in Figure 8.

It will be noted that the axis of the pivot pin 19 is rearwardly relative to the vertical axis of rotation of the frame which vertical axis is the center of the support S as shown in dotted lines in Figures 1 and 6. Accordingly as the propeller is tipped upwardly, the pressure of the wind thereagainst is effective to aid the vane V in directing the arms 10 and 11 toward the wind as the center of pressure is rearward of the vertical axis of rotation. This is a very desirable feature as distinguished from a wind driven generator of the type where the propeller is pivoted on an axis forwardly of the vertical pivotal axis thereby placing the center of pressure ahead of the vertical axis and tending to swing the frame of the structure either toward the right or left which results in an action which is contrary to the action of the vane instead of aiding it.

Another problem encountered with a wind driven generator in which the propeller axis tips upwardly, is that the propeller in rotating and due to the drag of the generator on it, tends to rotate the frame about the vertical axis as the propeller axis approaches vertical position. This is illustrated in Figure 6 in which the propeller rotates in the direction of the arrow $a$, which in tipped back position is the direction indicated by the arrow $a'$. The drag of the generator therefore tends to cause the frame of the machine to rotate in the direction of the arrow $b$ about the vertical axis. In Figure 6, I illustrate the generator and propeller located off center relative to the vertical axis as distinguished from coincident relation as shown in Figure 1. Accordingly the surface of the generator and the propeller presented to the wind tends to push them in the direction of the arrow $c$ and accordingly rotate the frame in the direction of the arrow $d$.

The arrows $b$ and $d$, it will be noted, are opposite relative to each other and thereby indicate counteracting rotational tendencies. Thereby it is obvious that offsetting the propeller axis relative to the vertical axis produces a desired counter-tendency toward rotation of the machine on its vertical axis during the self-governing operation of the structure. The direction of off set, of course, must be toward the right as shown in Figure 6 when the direction of rotation of the propeller is clockwise and vice versa in order to produce the counteracting tendency desired instead of aggravating the rotational tendency of the frame on its vertical axis.

In Figures 7 and 9 I show a modified structure in which the propeller, instead of being mounted on the shaft of the generator, is mounted on a separate shaft 43 and geared to the generator shaft 24 by step up gearing comprising a gear 44 and a pinion 45. The gear and the pinion are enclosed in a housing 46 closed by a cover plate 47. The housing has trunnions 18a and a wing 28a formed thereon. Otherwise the structure is similar to that shown in the previous figures of the drawings.

The thimble 30 is connected to the wing 28 by a bail 48 and the thimble may be pulled downwardly by control wires 49. The control wires are connected to a collar 50 rotatable on the thimble 30. The arrangement is such that the bail 48 pulls directly downwardly on the fin 28 to swing it about the pivot pin 19 during manual adjustment of the structure to inoperative position of the propeller as shown by dotted lines in Figure 2.

Some changes may be made in the construction and arrangement of the parts of my invention without, however, departing from the real spirit and purpose thereof. It is my intention therefore, to cover any modified forms of structure or use of mechanical equivalents, which may be reasonably included within the scope of the appended claims.

I claim as my invention:

1. In a wind driven generator structure, a frame pivoted on a vertical axis, a vane for normally maintaining said frame in one direction relative to the wind, a propeller journaled on a horizontal axis and pivotally mounted on a second horizontal axis relative to said frame, said horizontal axes being at right angles relative to each other, a generator driven by said propeller and means biasing said propeller axis to remain horizontal but permitting movement thereof from horizontal toward a vertical position against such biasing tendency upon excess wind pressure against the propeller, said horizontal axis of said propeller being in alignment with said vertical axis and said second horizontal axis being rearward of said vertical axis.

2. In a wind driven generator structure, a frame pivoted on a vertical axis, a vane for normally maintaining said frame in one direction relative to the wind, a propeller journaled on a horizontal axis and pivotally mounted on a second horizontal axis relative to said frame, said horizontal axes being at right angles relative to each other, a generator driven by said propeller and means biasing said propeller axis to remain horizontal but permitting movement thereof from horizontal toward a vertical position against such biasing tendency upon excess wind pressure against the propeller, said horizontal axis of said propeller being off set relative to said vertical axis and said second horizontal axis being rearward of said vertical axis, the direction of off set being such as to counteract rotation of said frame about said vertical axis caused by said propeller rotating when its axis is vertical.

3. In a wind driven generator, a frame pivoted on a vertical axis, means for normally maintaining said frame in a desired direction relative to the wind, a propeller journaled on a horizontal axis and pivotally mounted on a second horizontal axis relative to said frame, said horizontal axes being at right angles relative to each other, a generator driven by said propeller and means biasing said propeller axis to remain horizontal but permitting movement thereof from horizontal toward a vertical position against such biasing tendency upon excess wind pressure against the propeller, said horizontal axis of said propeller being offset relative to said vertical axis, the direction of offset being such as to counteract rotation of said frame about said vertical axis as caused by the propeller torque when its axis is tipped toward the vertical position by excess wind pressure.

4. In a wind driven generator of the class described, a frame pivoted on a vertical axis, a propeller journaled on a horizontal axis and pivotally mounted on a second horizontal axis relative to said frame, means for normally maintaining said frame in a direction with said propeller facing the wind, a generator driven by said propeller, said second horizontal axis being rearward of said vertical axis, whereby the center of pressure of the wind against said propeller when its axis is tipped toward the vertical position by excess wind pressure aids said means in maintaining said propeller facing the wind.

5. In a wind driven generator structure, a frame pivoted on a vertical axis, a vane for normally maintaining said frame in one direction relative to the wind, a propeller journaled on a horizontal axis, rotating in clockwise direction, and pivotally mounted on a second horizontal axis relative to said frame, said horizontal axes being at right angles relative to each other, a generator driven by said propeller, said horizontal axis of said propeller being off centered relative to said vertical axis in a right hand direction to counteract rotation of said frame about said vertical axis caused by said propeller rotating when its axis is tipped upwardly toward the vertical position by excess wind pressure thereagainst and such counteraction being produced by the pressure of the wind against the offset propeller.

6. In a wind driven generator structure, a pair of spaced vane arms, means for mounting said vane arms for pivotal movement on a vertical axis, a vane supported by said vane arms, a pivot pin crosswise of said vane arms, a generator having a member pivoted to said pivot pin, said pivot pin being located between said vertical axis and said vane, a propeller for driving said generator through step up gearing, a projection on said end plate, a spring connection between said projection and said vane arms, said projection being swingable to a position between said vane arms when said generator and propeller are tipped about said pivot pin as a result of excess wind pressure against the propeller, said spring connection being initially biased to aid the wind pressure in overcoming the weight of the generator and to oppose the tipping of the generator in proportion to the wind pressure increase when the weight of the generator passes to the other side of the pivot pin.

7. In a wind driven generator structure, a pair of spaced vane arms, means for mounting said vane arms for pivotal movement on a vertical axis, a vane supported by said vane arms, a pivot pin crosswise of said vane arms, a propeller pivotally mounted on said pivot pin, a generator driven by said propeller, a spring connected with the mounting for said propeller to assist to a predetermined degree the tipping thereof about said pivot pin as a result of wind pressure against the propeller, but opposing the tipping movement of the propeller as a result of excessive wind pressure increase thereagainst.

8. In a wind driven generator of the character disclosed, a frame, means for mounting said frame for pivotal movement on a vertical axis, a vane supported by said frame, a generator having a member pivoted to said frame between said vertical axis and said vane, a propeller for driving said generator, a projection on said generator, a spring connection between said projection and said frame, said spring connection being initially biased to aid the wind pressure in overcoming the weight of the generator on one side of the pivot connection during the tipping of the generator and to oppose the tipping movement thereof in proportion to the wind pressure increase when the weight of the generator passes to the other side of the pivot pin.

9. In a device of the class described, a vane arm, means for mounting said vane arm for pivotal movement on a vertical axis, a vane supported by said vane arm, a pivot pin crosswise of said vane arm, a propeller for driving a generator, gearing operated from the propeller and serving to operate the generator and located across the generator longitudinally from said propeller, a housing covering said gearing, lugs underlying said housing for connection to said pivot pin, a lever, a spring connecting said lever and said vane arm, said lever being swingable downwardly to a position adjacent said vane arm when said generator and propeller are tipped about said pivot pin as a result of excess wind pressure against the propeller.

10. In a wind driven structure, a pair of spaced vane arms, means for mounting said vane arms for pivotal movement on a vertical axis, a vane supported by said vane arms, a pivot pin crosswise of said vane arms, a generator having a member pivoted to said pivot pin, said pivot pin being located between said vertical axis and said vane, a propeller for driving said generator and a spring means opposing the tipping movement of the propeller upwardly about said pivot pin.

11. In a wind driven structure, a pair of spaced vane arms, means for mounting said vane arms for pivotal movement on a vertical axis, a vane supported by said vane arms, a pivot pin crosswise of said vane arms, a generator having a member pivoted to said pivot pin, said pivot pin being located between said vertical axis and said vane, a propeller for driving said generator and a spring means opposing the tipping movement of the propeller upwardly about said pivot pin, said spring means being initially biased to aid the wind pressure in overcoming the weight of the generator while overhanging one side of the pivot pin and when overhanging the opposite side being effective in its opposing operation in proportion to the increase of wind pressure against the propeller.

12. In a wind driven generator structure, a vertical support, a head pivotally mounted for rotation thereabout and comprising a plate having a pair of down turned flanges, a sleeve between and secured to said flanges, said plate having at its forward and rearward ends upstanding flanges, ears on said upstanding flanges, a pair of spaced vane arms, said ears being secured thereto, a vane supported by said vane arms, a generator, an end plate thereon, said end plate being pivoted to said vane arms, a pivot pin for the pivotal connection, a bracket for said pivot pin, said bracket including a plate encircling said pivot pin and having a pair of attaching flanges, clamp bolts through said attaching flanges and securing them to said vane arms, said clamp bolts preventing longitudinal movement of said pivot pin relative to said bracket, cushion means for said generator to engage when in normal position, a distributor for current from said generator to said vertical support, said distributor being located between said vane arms and below the top thereof, a cover for said distributor, said cover being slidably mounted on said vane arms and supporting said cushion means.

13. In a wind driven generator structure, a vertical support, a frame pivotally mounted for rotation thereabout, a vane connected to said frame, a generator, a rear end plate thereon, a member pivoted to said frame for tipping movement, a pivot pin for the pivotal connection, a bracket for said pivot pin, said bracket including a plate encircling said pivot pin and having a pair of attaching flanges, clamp bolts through said attaching flanges and securing them to said vane arms, said clamp bolts preventing longitudinal movement of said pivot pin relative to said bracket, cushion means for said generator to engage when in normal position, a distributor for current from said generator to said vertical support, said distributor being located between said vane arms and below the top thereof, a cover for said distributor, said cover being pivoted to said pivot pin and carrying said cushion.

14. In a wind driven generator structure, a vertical support, a frame pivotally mounted for rotation thereabout, a vane connected to said frame, a generator, a rear end plate thereon, said end plate being pivoted to said frame for tipping movement, a pivot pin for the pivotal connection, a bracket for said pivot pin, said bracket including a plate encircling said pivot pin and having a pair of attaching flanges and clamp bolts through said attaching flanges and securing them to said vane arms, said clamp bolts preventing longitudinal movement of said pivot pin relative to said bracket.

15. In a wind driven generator structure, a vertical support, a head member comprising a plate having a pair of down turned flanges, a sleeve between and secured to said flanges, said sleeve being rotatable on said support, said plate having at its forward and rearward ends upstanding flanges, ears on said upstanding flanges, a pair of spaced vane arms, said ears being secured thereto, a vane supported by said vane arms and a propeller driven generator pivotally connected to said vane arms.

16. In a wind driven generator structure, a vertical support, a frame pivotally mounted for rotation thereabout, a vane supported by said frame, a generator pivoted to said vane arms, a pivot pin for the pivotal connection, a bracket for said pivot pin, said bracket including a plate encircling said pivot pin and having a pair of attaching flanges and clamp bolts through said attaching flanges and securing them to said vane arms, said clamp bolts preventing longitudinal movement of said pivot pin relative to said bracket.

17. In a wind driven generator structure, a vertical support, a head member pivotally mounted for rotation thereabout including a pair of vane arms, a vane supported by said vane arms, a propeller driven generator, a distributor for current from said generator to said vertical support, said distributor being located between said vane ams and below the top thereof and a cover for said distributor mounted on top of said vane arms.

18. In a wind driven generator structure, a vertical support, a head member pivotally mounted for rotation thereabout including a pair of vane arms, a vane supported by said vane arms, a propeller driven generator, a pivot pin for the pivotal connection, a distributor for current from said generator to said vertical support, said distributor being located between said vane arms and below the top thereof and a cover for said distributor mounted on top of said vane arms and pivoted to said pivot pin.

19. In a wind driven generator, a vertical support, a frame pivotally mounted thereon, a vane supported by said frame, a propeller journaled on said frame and having pivotal connection thereto for tipping from a position with its axis of rotation horizontal toward a position with its axis of rotation vertical as a result of excessive wind pressure against said propeller, a generator driven by said propeller, means assisting such tipping of the propeller, the effect of said means decreasing with an increase of wind pressure, said means including a lever arm extending rearwardly from the pivotal connection of said propeller and a manual throw-out mechanism vertically slidable on said vertical support and connected with said arm to pull downwardly thereon and thereby to swing said arm and said propeller about said pivotal connection toward position with the propeller axis vertical.

20. In a wind driven generator, a vertical support, a frame pivotally mounted thereon, a vane supported by said frame, a propeller journaled on said frame and pivoted thereto for tipping from a position with its axis of rotation horizontal toward a position with its axis of rotation vertical as a result of excessive wind pressure against said propeller, a generator driven by said propeller, a lever arm extending from the pivotal connection of said propeller and a manual throw-out mechanism vertically slidable on said vertical support and connected with said arm to pull downwardly thereon and thereby to swing said arm and said propeller about said pivotal connection toward position with the propeller axis vertical, said arm being operatively positioned to leeward of said vertical support.

21. In a wind driven generator structure, a vertical support, a frame pivotally mounted thereon, a vane connected to said frame, a propeller journaled on said frame and pivoted thereto for tipping from a position with its axis of rotation horizontal toward a position with its axis of rotation vertical as a result of excessive wind pressure against said propeller, a generator driven by said propeller, means assisting such tipping of the propeller, said means including a lever extending rearwardly from the pivotal connection of said propeller to said frame and a spring connection between said lever and said frame.

22. In a wind driven generator structure, a supporting pivot member, a propeller operatively positioned to windward of said supporting pivot member, a tail vane across said pivot from said propeller, a horizontal trunnion pin about which said generator swings, said pin being on the leeward side of said supporting pivot.

23. In a wind driven generator structure, a propeller driven generator mounted on a horizontal axis located outside the center of gravity of said generator and means counteracting the weight of said generator.

24. In a wind driven generator structure, a generator swingable about an axis so positioned that the weight of said generator is on one side of said axis when in a horizontal position and on the opposite side of said axis when in a vertical position, and means counteracting the weight of said generator when in either position.

25. In a wind driven generator structure, a frame swingable on a vertical pivot, a generator, an impeller therefor and adjacent one end thereof, and a horizontal pivot adjacent the opposite end thereof and affixed to said frame.

26. In a wind driven generator structure, a generator, a pivot pin therefor outside its center of gravity, a propeller offset from said pivot for overcoming the weight of said generator when influenced by wind pressure and auxiliary means for assisting said propeller in overcoming the weight of said generator.

27. In a wind driven generator structure, a vertical support, a frame pivotally mounted thereon, a vane connected to said frame, a propeller journaled on said frame and pivoted thereto for tipping from a position with its axis of rotation horizontal toward a position with its axis of rotation vertical as a result of excessive wind pressure against said propeller, a generator driven by said propeller, means opposing such tipping of the propeller, said means including a lever extending rearwardly from the pivotal connection of said propeller to said frame and a spring connection between said lever and said frame, said spring connection, during initial tipping of the propeller, counteracting the weight thereof and aiding the wind pressure and during final tipping of the propeller opposing the wind pressure.

WILLIAM G. DUNN.